US011162213B2

(12) United States Patent
Tamura et al.

(10) Patent No.: US 11,162,213 B2
(45) Date of Patent: Nov. 2, 2021

(54) COMPOSITE HAVING OPTICALLY TRANSPARENT RESIN LAYER

(71) Applicant: Chukoh Chemical Industries, Ltd., Tokyo (JP)

(72) Inventors: Shigenori Tamura, Matsuura (JP); Yuto Yamaguchi, Matsuura (JP)

(73) Assignee: Chukoh Chemical Industries, Ltd., Tokyo (JP)

( * ) Notice: Subject to any disclaimer, the term of this patent is extended or adjusted under 35 U.S.C. 154(b) by 804 days.

(21) Appl. No.: 14/701,215

(22) Filed: Apr. 30, 2015

(65) Prior Publication Data
US 2015/0275420 A1 Oct. 1, 2015

Related U.S. Application Data

(63) Continuation of application No. PCT/JP2013/079469, filed on Oct. 30, 2013.

(30) Foreign Application Priority Data

Nov. 1, 2012 (JP) .............................. JP2012-241753

(51) Int. Cl.
*D06M 15/256* (2006.01)
*D06M 11/79* (2006.01)
(Continued)

(52) U.S. Cl.
CPC ........... *D06M 15/256* (2013.01); *B32B 5/024* (2013.01); *B32B 27/12* (2013.01); *B32B 27/304* (2013.01);
(Continued)

(58) Field of Classification Search
CPC ............ H02M 5/00; H03M 1/00; H03M 1/12; H03M 3/30; H03M 3/458; H03M 3/504; B32B 2260/021; B32B 2260/046; B32B 2262/0269; B32B 2262/10; B32B 2262/101; B32B 2262/106;
(Continued)

(56) References Cited

U.S. PATENT DOCUMENTS 8,173,557 B2 5/2012 Higuchi
2004/0224590 A1* 11/2004 Rawa .................... B29C 70/088
442/176
(Continued)

FOREIGN PATENT DOCUMENTS

CN 101240509 A 8/2008
CN 201169866 Y 12/2008
(Continued)

OTHER PUBLICATIONS https://patents.google.com/patent/JPS61185441A/en?oq= JP61185441 (Year: 1984).*
(Continued)

*Primary Examiner* — Arti Singh-Pandey
(74) *Attorney, Agent, or Firm* — Christensen O'Connor Johnson Kindness PLLC

(57) ABSTRACT

According to one embodiment, a composite includes a substrate and an optically transparent resin layer formed on the substrate. The substrate includes a woven fabric and a composition layer formed on the woven fabric and including tetrafluoroethylene resin and silicon dioxide.

12 Claims, 1 Drawing Sheet

(51) Int. Cl.
| | |
|---|---|
| *D06N 3/04* | (2006.01) |
| *D06N 3/00* | (2006.01) |
| *C03C 25/47* | (2018.01) |
| *D06M 23/08* | (2006.01) |
| *C03C 25/1095* | (2018.01) |
| *B32B 27/30* | (2006.01) |
| *B32B 27/12* | (2006.01) |
| *B32B 5/02* | (2006.01) |
| *B32B 27/32* | (2006.01) |

(52) U.S. Cl.
CPC .......... *C03C 25/1095* (2013.01); *C03C 25/47* (2018.01); *D06M 11/79* (2013.01); *D06M 23/08* (2013.01); *D06N 3/0006* (2013.01); *D06N 3/0022* (2013.01); *D06N 3/047* (2013.01); *B32B 27/322* (2013.01); *B32B 2260/021* (2013.01); *B32B 2260/046* (2013.01); *B32B 2262/0269* (2013.01); *B32B 2262/10* (2013.01); *B32B 2262/101* (2013.01); *B32B 2262/106* (2013.01); *B32B 2264/102* (2013.01); *B32B 2307/412* (2013.01); *B32B 2307/50* (2013.01); *B32B 2307/54* (2013.01); *B32B 2307/546* (2013.01); *B32B 2307/712* (2013.01); *B32B 2307/7265* (2013.01); *B32B 2410/00* (2013.01); *B32B 2419/06* (2013.01); *B32B 2607/00* (2013.01); *D06N 2201/082* (2013.01); *D06N 2209/0861* (2013.01); *D06N 2209/0869* (2013.01); *D06N 2211/06* (2013.01); *Y10T 442/20* (2015.04)

(58) Field of Classification Search
CPC ........ B32B 2264/102; B32B 2307/412; B32B 2307/50; B32B 2307/54; B32B 2307/546; B32B 2307/712; B32B 2307/7265; B32B 2410/00; B32B 2419/06; B32B 2607/00; B32B 27/12; B32B 27/304; B32B 27/322; B32B 5/024; C03C 25/1095; C03C 25/47; D06M 11/79; D06M 15/256; D06M 23/08; D06N 2201/082; D06N 2209/0861; D06N 2209/0869; D06N 2211/06; D06N 3/0006; D06N 3/0022; D06N 3/047; Y10T 442/20
See application file for complete search history.

(56) References Cited

U.S. PATENT DOCUMENTS

| | | | |
|---|---|---|---|
| 2006/0141243 A1* | 6/2006 | Ibuki | B32B 7/02 428/334 |
| 2006/0154395 A1 | 7/2006 | Kim | |
| 2011/0281484 A1 | 11/2011 | Yoshida | |
| 2013/0183087 A1* | 7/2013 | Weibel | F16B 7/18 403/343 |
| 2013/0337250 A1* | 12/2013 | Austin | C09J 7/29 428/219 |

FOREIGN PATENT DOCUMENTS

| | | |
|---|---|---|
| CN | 100573240 C | 12/2009 |
| CN | 102423943 A | 4/2012 |
| JP | 61-185441 A | 8/1986 |
| JP | 08-085186 A | 4/1996 |
| JP | 10-193528 A | 7/1998 |
| JP | 2009-107273 A | 5/2009 |
| JP | 2011-106055 A | 6/2011 |
| WO | 2008/105298 A1 | 9/2008 |

OTHER PUBLICATIONS https://patents.google.com/patent/JPH10193528A/en?oq=JP10-193528 (Year: 1997).*
Invitation to Respond to Written Opinion dated Aug. 15, 2016, issued in corresponding Singapore Application No. 11201503361S, filed Oct. 30, 2013, 5 pages.
Invitation to Respond to Written Opinion dated Jan. 25, 2016, issued in corresponding Singapore Application No. 11201503361S, filed Oct. 30, 2013, 8 pages.
Chinese Office Action dated Apr. 12, 2016, issued in corresponding Chinese Application No. 201380057121.3, filed Oct. 30, 2013, 15 pages.
Notification of the Second Office Action dated Dec. 14, 2016, issued in corresponding Chinese Application No. 201380057121.3, filed Oct. 30, 2013, 19 pages.
First Office Action, dated Sep. 6, 2016, issued in corresponding Japanese Application No. 2012-241753, filed Nov. 1, 2012, 8 pages.
International Preliminary Report on Patentability and Written Opinion dated May 5, 2015, issued in corresponding International Application No. PCT/JP2013/079469, filed Apr. 30, 2015, 11 pages.
International Search Report dated Jan. 28, 2014, issued in corresponding International Application No. PCT/JP2013/079469, filed Apr. 30, 2015, 5 pages.
First Office Action dated Feb. 9, 2016, issued in Japanese Patent Application No. 2012-241753, filed Nov. 1, 2012, 7 pages.
Extended European Search Report dated May 25, 2016, issued in corresponding Application No. 13850786.8, filed Oct. 30, 2013, 6 pages.
Extended European Search Report dated Feb. 26, 2018, issued in corresponding European Application No. 17198703.5, 6 pages.
Search Report and First Examination Report issued in UAE Application No. 0556/2015, filed Apr. 30, 2015, 9 pages.
First Office Action dated May 24, 2019, issued in Chinese Application No. 201711129760.2, filed Oct. 30, 2013, 12 pages.
Search Report and Written Opinion dated Jun. 8, 2018, issued in corresponding Singapore Application No. 10201705837W, filed Oct. 30, 2013, 8 pages.

* cited by examiner

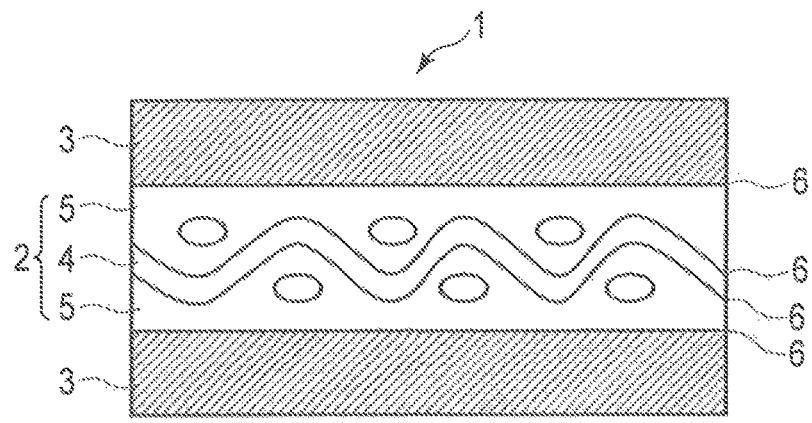
F I G. 1
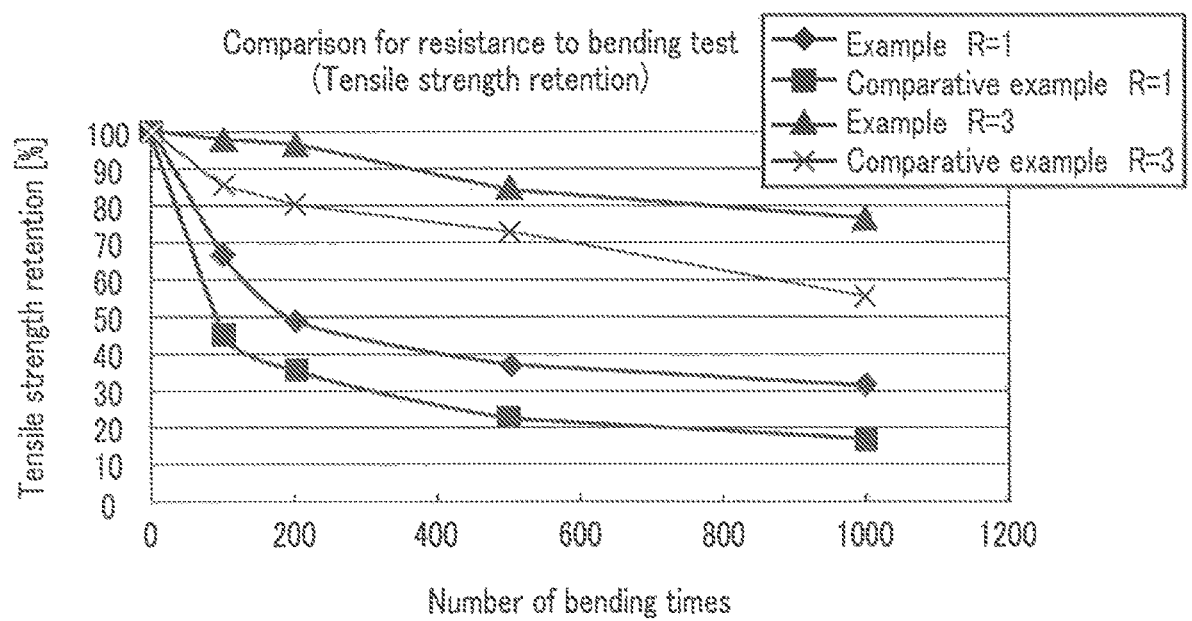
F I G. 2

COMPOSITE HAVING OPTICALLY TRANSPARENT RESIN LAYER

CROSS-REFERENCE TO RELATED APPLICATIONS

This application is a Continuation Application of PCT Application No. PCT/JP2013/079469, filed Oct. 30, 2013 and based upon and claiming the benefit of priority from prior Japanese Patent Application No. 2012-241753, filed Nov. 1, 2012, the entire contents of all of which are incorporated herein by reference.

TECHNICAL FIELD

The present invention relates to a composite.

BACKGROUND ART

A sheet in which a resin film is laminated on a woven or nonwoven fabric is used in many fields as a composite material having high optical transparency. A fiber made of glass or the like is used for the woven, or nonwoven fabric and a wide variety of filling treatments are applied for retaining the shape of the fabric. A thermoplastic resin is widely used for the treatments. Also, for a laminated sheet used in building applications, a fluororesin film which is excellent in weather resistance, stain resistance, water resistance, and the like is widely used as the resin film.

For example, Patent Literature 1 describes a laminated sheet in which a woven or nonwoven fabric comprised of glass fibers bonded with a binder and a fluorine-containing resin film are laminated, wherein a so-called melt type fluororesin is used in the binder.

However, conventional laminated sheets have problems in strength against bending stress, adhesion between resin layers, and handling.

CITATION LIST

Patent Literature

Patent Literature 1: International Publication No. WO 2008/105298 A1

BRIEF SUMMARY OF THE INVENTION

Technical Problem

The problem to be solved by the present invention is to provide a composite which is excellent in strength against bending stress, adhesion between resin layers, and handling.

Solution to Problem

According to the present invention, a composite includes a substrate and an optically transparent resin layer formed on the substrate. The substrate includes a woven fabric and a composition layer formed on the woven fabric and including tetrafluoroethylene resin and silicon dioxide.

Advantageous Effects of Invention

The present invention can provide a composite which is excellent in strength against bending stress, adhesion between resin layers, and handling.

BRIEF DESCRIPTION OF DRAWINGS

FIG. 1 is a cross-sectional view of a composite according to an embodiment.

FIG. 2 is a figure showing the relationship between the number of bending times and tensile break strength retention for the composites of Examples and Comparative Examples.

The accompanying drawings, which are incorporated in and constitute a part of the specification illustrate embodiments of the invention, and together with the general description given above and the detailed description of the embodiments given below, serve to explain the principles of the invention.

DETAILED DESCRIPTION OF THE INVENTION

Hereinafter, embodiments of the present invention will be described in detail.

A composite comprises a substrate and an optically transparent resin layer formed on the substrate. The substrate comprises a woven fabric and a composition layer formed on the woven fabric and comprising tetrafluoroethylene resin and silicon dioxide. Such composite can improve the flexibility of the substrate. Therefore, even when subjected to a bending process in which the radius of curvature is small, the occurrence of cracking in the composition layer due to kinking (buckling) can be reduced. As a result, the concentration of stress to fibers constituting the woven fabric can be reduced, leading to delay of the strength reduction of single fibers that occurs when repeated bending stresses are applied. Therefore, the composite according to the embodiment can improve the strength against bending stress.

Also, the silicon dioxide contained in the composition layer can improve the adhesion between the composition layer and the optically transparent resin layer.

Further, the composite is improved not only in the strength against bending stress and the adhesion between resin layers but also in flexibility. Hence, the composite is easy to handle, easy to carry, and easy to construct, as well as excellent in handling.

On the other hand, when a melt type fluororesin layer is formed on the woven fabric instead of the composition layer comprising tetrafluoroethylene resin and silicon dioxide, the substrate becomes stiff. Thus, when the bending process in which the radius of curvature is small is conducted or bending stress is applied repeatedly, cracks occur in the resin layer itself because the melt type fluororesin layer kinks. Further, the stress is also concentrated on the single fibers constituting the woven fabric, causing the strength reduction or breaking of the single fibers.

Hereinafter, the substrate and optically transparent resin layer of the composite of an embodiment will be described.

The woven fabric constituting the substrate is, for example, formed from yarns comprised of single fiber bundles. The material of the single fiber may include, for example, at least one selected from the group consisting of glass, aromatic polyamide, carbon, and alumina. One or more bonds of fiber may be used. Preferred are ones including glass fiber.

It is desirable for the single fiber to have a fiber diameter in the range of 3 μm to 9 μm. Further, it is desirable for the yarn comprised of single fiber bundles to be in the range of 10 tex to 300 tex. These features can further improve the flexibility and strength of the woven fabric.

The weave of the woven fabric may be plain weave, twill weave, satin weave, leno weave, or mock leno weave.

The opening ratio of the weave of the woven fabric is measured by the following method. A woven fabric having a size of 100 mm (length)×100 mm (width) (woven fabric coated with tetrafluoroethylene resin) is used as a sample, and the area of the opening portion of the sample is measured by microscope (model VHX-1000 manufactured by Keyence Corporation, or one having equivalent performance) and calculated by the following equation.

$$X=(S_1/S_2)\times 100$$

wherein X is the opening ratio of the woven fabric (%), $S_1$ is the area of the opening portion of the woven fabric ($mm^2$), and $S_2$ is the area of the woven fabric ($mm^2$).

Desirably, the opening ratio of the woven fabric is in the range of 10% to 30%. A composite having desired light transmittance can be obtained with this range. The light transmittance is measured by a method conforming to JIS R 3106.

It is desirable that the light transmittance of the composite be 30% to 95%. This provides the composite with desirable strength and optimum space brightness. A further preferred range is from 50% to 90%.

The composition layer formed on the woven fabric comprises tetrafluoroethylene resin and silicon dioxide. Although tetrafluoroethylene resin particles can be distributed over a part or all of the composition layer, it is desirable that the woven fabric be coated with tetrafluoroethylene resin particles for the strength against bending stress of the composite. On the other hand, although silicon dioxide particles may be distributed over a part or all of the composition layer, it is desirable that they be exposed on the surface of the composition layer and be contacted with the optically transparent resin layer for the adhesion between resin layers.

A melt-flowable fluororesin may be added to the composition layer as needed. The melt-flowable fluororesin can increase the fusion bondability between the composition layer and the optically transparent resin layer. Melt-flowable fluororesin particles can be distributed over a part or all of the composition layer. Specifically, the melt-flowable fluororesin particles can be retained in the woven fabric or can be present on the surface of the composition layer.

The tetrafluoroethylene resin is present in the form of a sintered body of the tetrafluoroethylene resin particles in the composition layer. It is desirable that the tetrafluoroethylene resin particles have an average primary particle size in the range of 0.02 μm to 0.5 μm. A more preferred range is from 0.1 μm to 0.3 μm.

It is desirable that the weight percent of the tetrafluoroethylene resin in the weight of the substrate be in the range of 5% by weight to 40% by weight. The reason for this is as follows. When the weight percent of the tetrafluoroethylene resin is 5% by weight or more, the deformation of the woven fabric constituting the substrate can be suppressed upon external stress being imposed during construction or the like. However, when the amount of the tetrafluoroethylene resin increases, sufficient fusion bondability with the optically transparent resin layer cannot be ensured and product cost itself increases. The problem of decrease in fusion bondability tends to occur when the composite is prepared in a later-described method. In the later-described method, a tetrafluoroethylene resin layer is formed on the woven fabric and then the woven fabric is impregnated with a dispersion obtained by mixing an aqueous dispersion of the melt-flowable fluororesin particles with the silicon dioxide particles. When the amount of the tetrafluoroethylene resin increases, it becomes difficult to form the layer on the tetrafluoroethylene resin surface by using the dispersion, which means that sufficient fusion bondability with the optically transparent resin layer cannot be ensured. Further, when the amount of the tetrafluoroethylene resin increases, the weight of the product becomes large, increasing the building cost due to the need to strengthen the building. Hence, it is desirable that the weight percent of the tetrafluoroethylene resin be 40% by weight or less. A more preferred range is from 10% by weight to 25% by weight.

It is preferred that silicon dioxide ($SiO_2$) be amorphous silica. It is more preferred that the amorphous silica be hydrophilic amorphous silica.

It is preferred that the silicon dioxide particles have a specific surface area of 10 $m^2/g$ or more as determined by the Brunauer-Emmett-Teller (BET) adsorption isotherm. When the specific surface area is 10 $m^2/g$ or more, the adherence between the optically transparent resin layer and the composition layer may be improved. A more preferred range is from 50 $m^2/g$ to 400 $m^2/g$.

It is preferred that the silicon dioxide particles have an average primary particle size in the range of 5 nm to 80 nm. A more preferred range is from 7 nm to 40 nm.

The average primary particle size of the tetrafluoroethylene resin particles and that of the silicon dioxide particles can be measured by a transmission electron microscope.

It is preferred that the weight percent of silicon dioxide in the weight of the composition layer be in the range of 0.5% by weight to 30% by weight. When the weight percent of silicon dioxide is 0.5% by weight or more, the adherence between the optically transparent resin layer and the composition layer may be improved. When the amount of silicon dioxide becomes large, the adherence between the optically transparent resin layer and the composition layer becomes high, but the flexibility of the substrate may be decreased. When the weight percent of silicon dioxide is 30% by weight or less, a substrate excellent in flexibility can be obtained. A more preferred range is from 5% by weight to 20% by weight.

Examples of the melt-flowable fluororesin include ethylene-tetrafluoroethylene copolymer (ETFE), tetrafluoroethylene-perfluoroalkyl vinyl ether copolymer (PFA), and tetrafluoroethylene-hexafluoropropylene copolymer (FEP). One or more kinds of resin may be used.

Desirably, the optically transparent resin layer contains the melt-flowable fluororesin. Examples of the melt-flowable fluororesin include ethylene-tetrafluoroethylene copolymer (ETFE), tetrafluoroethylene-perfluoroalkyl vinyl ether copolymer (PFA), and tetrafluoroethylene-hexafluoropropylene copolymer (FEP), polyvinylidene fluoride (PVDF). One or more kinds of resin may be used.

It is desirable that the composite has a tensile break strength of 300 N/15 mm or more and a tensile break elongation of 35% or less. The tensile break strength and the tensile break elongation are measured by a method conforming to JIS L1096 Strip method (cut strip; tension speed: 200 mm/min; test piece width: 30 mm).

The composite is prepared, for example, by the following method.

A woven fabric is coated with an aqueous dispersion of tetrafluoroethylene resin particles (hereinafter, a first dispersion) by impregnation, dried at a temperature of 100° C. to 200° C., and then sintered at an ambient temperature of 330° C. to 400° C. A tetrafluoroethylene resin layer is formed on the woven fabric by repeating a series of the steps of coating, drying, and sintering multiple times. Then, a dispersion prepared by mixing an aqueous dispersion of melt-flowable fluororesin particles with silicon dioxide particles (hereinafter, a second dispersion) is provided, and the woven fabric having a tetrafluoroethylene resin layer formed thereon is coated with this dispersion by impregnation, and dried at a temperature of 100° C. to 200° C., followed, by sintering at an ambient temperature of 330° C. to 400° C. A composition layer comprising tetrafluoroethylene resin, melt-flowable fluororesin, and silicon dioxide is turned on the woven fabric by repeating the series of the steps of coating, drying, and sintering multiple times, to obtain a substrate. Optical transparency resin films are placed on both sides of the substrate, and then subjected to thermocompression bonding by a heating pressure press, followed by cooling by a cooling pressure press, to obtain a composite.

Note that the melt-flowable fluororesin particles may be added to the first dispersion. Further, in the above-described method, the series of the steps of coating, drying, and sintering of the second dispersion is conducted after the series of the steps of coating, drying, and sintering of the first dispersion, but the series of the steps of coating, drying, and sintering of the first dispersion and the series of the steps of coating, drying, and sintering of the second dispersion may be repeated alternately.

When undertaking preparations using the methods described above, the dispersibility of the tetrafluoroethylene resin particles in the first dispersion can be increased by providing tetrafluoroethylene resin particles having an average primary particle size in the range of 0.02 µm to 0.5 µm. Also, the dispersibility of the silicon dioxide particles in the second dispersion can be increased by providing silicon dioxide particles having an average primary particle size in she range of 5 nm to 80 nm. Thus, a composition layer is obtained by repeating a process wherein a dispersion in which the tetrafluoroethylene resin particles are uniformly dispersed and another dispersion in which the silicon dioxide particles are uniformly dispersed are respectively applied to the woven fabric, dried, and sintered, and thus, a composition layer having almost the same dispersibility as that of the tetrafluoroethylene resin particles or of the silicon dioxide particles in the dispersion can be achieved.

A schematic cross section of an example of the composite is shown in FIG. 1. As illustrated in FIG. 1, a composite 1 has a substrate 2 and optically transparent resin layers 3 formed on both sides of the substrate 2. The substrate 2 has a woven fabric 1 and composition layers 5 formed on both sides of the woven fabric 4. The composition layer 5 comprises tetrafluoroethylene resin and silicon dioxide. In FIG. 1, interfaces 6 are shown, for the sake of convenience, between the woven fabric 4, the composition layers 5, and the optically transparent resin layers 3 to illustrate how each layer is laminated. However, in the above-described preparation method, the steps of coating, drying, and sintering of the first and second dispersion are repeated to obtain the composition layers, thereby clear interfaces may not be present in the composition layers or between the composition layers and the woven fabric.

It is acceptable that the composite may contain other layers than the substrate and the optically transparent resin layer (for example, a light diffusing layer, and an antifouling layer).

Applications of the composite may include, for example, roofing materials for a large scale greenhouse and an atrium and the like, external walls for athletic facilities, roofing materials, medium-sized and large-scale tents, and membrane structures such as coating materials for an agricultural greenhouse.

EXAMPLES

Hereinafter, examples will be described.

Example

A glass fiber woven fabric having a leno weave structure (thickness: 580 µm, 370 g/m² mesh) (manufactured by Nitto Boseki Co., Ltd.) as a heat-resistant woven fabric was coated, by impregnation, with an aqueous dispersion of tetrafluoroethylene resin fine particles which is comprised of 60% by weight of tetrafluoroethylene resin (PTFE) particle content (average primary particle size: 0.2 µm), 6% by weight of a nonionic surface active agent, and 34% by weight of water (manufactured by DAIKIN INDUSTRIES, LTD), and dried for 5 minutes in a sealed furnace in which the ambient temperature was adjusted to 100° C. to remove water, and then sintered for 5 minutes in the sealed furnace in which the ambient temperature was adjusted to 360° C. By repeating this series of she steps of impregnation, drying, and sintering multiple times, a tetrafluoroethylene resin layer having a thickness of 50 µm was obtained. The opening ratio of the woven fabric coated with the tetrafluoroethylene resin layer was 60%.

Then, an aqueous dispersion of tetrafluoroethylene-hexafluoropropylene copolymer resin particles was prepared by mixing and agitating 1 kg of an aqueous dispersion of tetrafluoroethylene-hexafluoropropylene copolymer resin (FEP) particles (manufactured by Du Pont-Mitsui Fluorochemicals Company, Ltd.) and 0.1 kg of hydrophilic amorphous silica particles (manufactured by NIPPON AEROSIL CO., LTD., and having a specific surface area of 50 m²/g as determined, by Brunauer-Emmett-Teller (BET) adsorption isotherm, and an average primary particle size of 30 nm). The glass fiber woven fabric having the tetrafluoroethylene resin layer formed thereon was coated with this dispersion by impregnation, and dried for 5 minutes in the sealed furnace in which the ambient temperature was adjusted to 100° C. to remove water, and then sintered for 5 minutes in the sealed furnace in which the ambient temperature was adjusted to 360° C. By repeating this series of the steps of impregnation, drying, and sintering multiple times, a tetrafluoroethylene-hexafluoropropylene copolymer resin layer having a thickness of 20 µm is formed on the tetrafluoroethylene resin layer to obtain a composition layer having a PTFE resin amount of 85 g/m² and a FEP resin amount of 30 g/m².

An ETFE film of 100 µm was thermocompression bonded to each of both sides of a substrate prepared as described above at a temperature of 300° C. and at a pressure of 3.4 kgf/cm² for 3 minutes. Then, cold pressing was conducted at a temperature of about 25° C. and at a pressure of 1 kgf/cm² for 20 seconds, so that the ETFE film was fusion bonded on the substrate to obtain a composite of Example.

For the composite of Example, the weight percent of the tetrafluoroethylene resin in the weight of the substrate was 17.5% by weight, the weight percent of the hydrophilic amorphous silica in the weight of the composition layer was 3.9% by weight, and the weight percent of the tetrafluoroethylene-hexafluoropropylene copolymer in the weight of the substrate was 6.2% by weight.

Comparative Example

A glass fiber woven fabric (manufactured by Nitto Boseki Co., Ltd.) similar to that of Example was coated with an aqueous dispersion of tetrafluoroethylene-hexafluoropropylene copolymer resin particles which has a tetrafluoroethylene-hexafluoropropylene copolymer particle content of 60% by weight (manufactured by Du Pont-Mitsui Fluorochemicals Company, Ltd.) by impregnation, dried for 5 minutes in a sealed furnace in which the ambient temperature was adjusted to 100° C. to remove water, and sintered for 5 minutes in the sealed furnace in which the ambient temperature was adjusted to 360° C. By repeating this series of the steps of impregnation, drying, and sintering multiple times, a tetrafluoroethylene-hexafluoropropylene copolymer resin layer having a thickness of 50 µm was obtained.

An ETFE film of 100 µm was laminated on both sides of the substrate consisting of the obtained fiber base cloth, and, under the same conditions as in Example, the ETFE film was fusion bonded to the substrate by thermocompression bonding and cold pressing to obtain a composite of Comparative Example.

For the composites of Example and Comparative Example, the relationship between the number of bending times and tensile break strength was determined by the following test method. The results are shown in Table 1 below.

The test was conducted according to the method conforming to TEST METHODS FOR MEMBRANE MATERIALS—QUALITIES AND PERFORMANCES (MSAJ/M-03-2003) (Standards of the Membrane Structures Association of Japan). That is, MIT testing machine was used, and test pieces were repeatedly bent at specified times under conditions of a load of 1 kg/1.5 cm, a bending angle of 175°, and R=1 or 3 to determine the tensile break strength. The number of bending times was varied and the bending was conducted 100, 200, 500, or 1000 times. The tensile break strength was measured according to a method conforming to JIS L1096 Strip method (cut strip, tension speed: 200 mm/min, test piece width: 30 mm). Further, the tensile break strength retention is defined as the value of the tensile break strength after bending was conducted 100, 200, 500, or 1000 times when the tensile break strength of the test piece before bending is conducted which is assumed to be 100%. The tensile break strength and tensile break strength retention after bending was conducted using each of the number of bending times of 0, 100, 200, 500, and 1000 are shown in Table 1, and the tensile break strength retention after bending was conducted using each of the number of bending times of 0, 100, 200, 500, and 1000 is shown in FIG. 2.

As apparent from Table 1 and FIG. 2, the tensile break strength retention of the composites of Examples after bending of the test pieces was repeatedly conducted under the condition of R=3 is larger than that of Comparative Examples in any of the number of bending times of 100, 200, 500, and 1000. And under even the condition of R=1 (more severe than R=3), the tensile break strength retention of the composites of Examples after bending was conducted using each of the number of bending times of 100, 200, 500, and 1000 is larger than that of Comparative Examples. Thus, the composites of Examples are superior to those of Comparative Examples in tensile break strength, and therefore are the composites which are excellent in strength against bending stress, adhesion between resin layers, and handling.

REFERENCE SIGNS LIST

1 . . . composite, 2 . . . substrate, 3 . . . optically transparent resin layer, 4 . . . woven fabric, 5 . . . composition layer, 6 . . . interface Additional advantages and modifications will readily occur to those skilled in the art. Therefore, the invention in its broader aspects is not limited no the specific details and representative embodiments shown and described herein. Accordingly, various modifications may be made without departing from the spirit or scope of the general inventive concept as defined by the appended claims and their equivalents.

What is claimed is:

1. A composite comprising a substrate and an optically transparent resin layer formed on the substrate,
wherein the substrate comprises a woven fabric and a composition layer formed in and on the woven fabric,
the composition layer consisting of tetrafluoroethylene resin, silicon dioxide, and melt-flowable fluororesin, and
wherein the optically transparent resin layer is formed on the composition layer.

2. The composite according to claim 1, wherein the tetrafluoroethylene resin has an average primary particle size in the range of 0.02 µm to 0.5 µm.

3. The composite according to claim 1, wherein the silicon dioxide is hydrophilic amorphous silica.

4. The composite according to claim 1, wherein the silicon dioxide has a specific surface area of 10 m$^2$/g or more as determined by Brunauer-Emmett-Teller (BET) adsorption isotherm.

5. The composite according to claim 1, wherein the silicon dioxide has an average primary particle size in the range of 5 nm to 80 nm.

TABLE 1

| The number of bending times | Example (R = 1) Tensile break strength (N/15 mm) | Example (R = 1) Tensile break strength retention (%) | Example (R = 3) Tensile break strength (N/15 mm) | Example (R = 3) Tensile break strength retention (%) | Comparative Example (R = 1) Tensile break strength (N/15 mm) | Comparative Example (R = 1) Tensile break strength retention (%) | Comparative Example (R = 3) Tensile break strength (N/15 mm) | Comparative Example (R = 3) Tensile break strength retention (%) |
|---|---|---|---|---|---|---|---|---|
| 0 | 1052 | 100 | 1052 | 100 | 1101 | 100 | 1101 | 100 |
| 100 | 703 | 66.8 | 1033 | 98.2 | 496 | 45.0 | 942 | 85.6 |
| 200 | 515 | 49.0 | 1024 | 97.3 | 392 | 35.6 | 886 | 80.5 |
| 500 | 390 | 37.1 | 896 | 85.2 | 249 | 22.6 | 801 | 72.8 |
| 1000 | 335 | 31.8 | 815 | 77.5 | 193 | 17.5 | 611 | 55.5 |

6. The composite according to claim 1, wherein a weight percent of the tetrafluoroethylene resin in a weight of the substrate is in the range of 5% by weight to 40% by weight.

7. The composite according to claim 1, wherein a weight percent of the silicon dioxide in a weight of the composition is in the range of 0.5% by weight to 30% by weight.

8. The composite according to claim 1, wherein the optically transparent resin layer comprises at least one resin selected from the group consisting of ethylene-tetrafluoroethylene copolymer, tetrafluoroethylene-perfluoroalkyl vinyl ether copolymer, tetrafluoroethylene-hexafluoropropylene copolymer, and polyvinylidene fluoride.

9. A membrane structure comprising the composite according to claim 1.

10. The composite according to claim 1, wherein the melt-flowable fluororesin is at least one selected from the group consisting of ethylene-tetrafluoroethylene copolymer, tetrafluoroethylene-perfluoroalkyl vinyl ether copolymer, and tetrafluoroethylene-hexafluoropropylene copolymer.

11. A composite comprising a substrate and optically transparent resin layers formed on both sides of the substrate,
  wherein the substrate comprises a woven fabric and a composition layer formed on both sides of the woven fabric, and the composition layer consists of tetrafluoroethylene resin, silicon dioxide and melt-flowable fluororesin, and
  wherein the optically transparent resin layers are formed on the composition layer.

12. The composite according to claim 11, wherein the tetrafluoroethylene resin, the silicon dioxide and the melt-flowable fluororesin are in one coating forming the composition layer.

* * * * *